July 9, 1940.   H. L. EASTUS   2,207,342
GLASS BUILDING BLOCK MANUFACTURE
Filed May 7, 1937
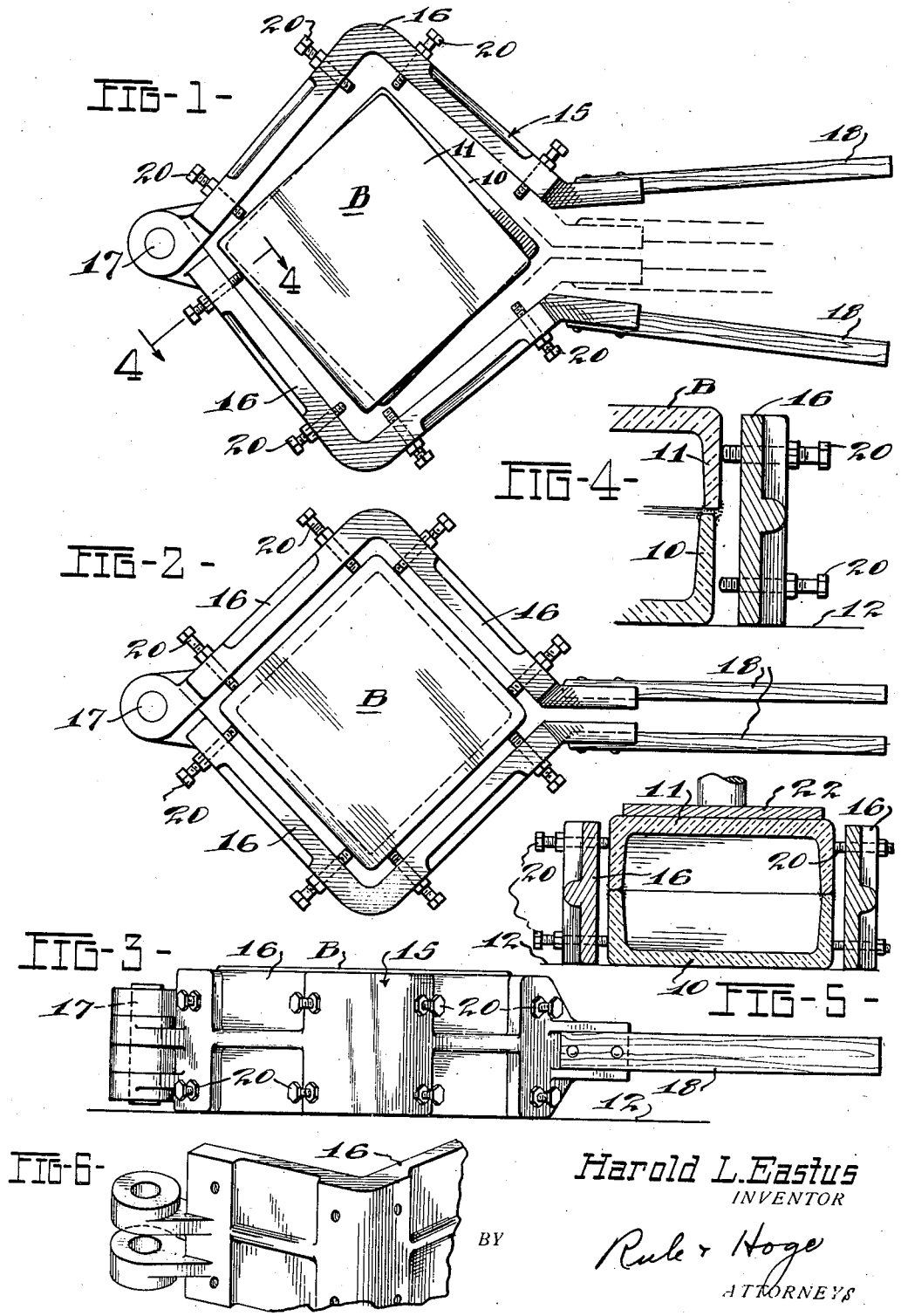
Harold L. Eastus
INVENTOR
BY Rule + Hoge
ATTORNEYS Patented July 9, 1940

2,207,342

UNITED STATES PATENT OFFICE 2,207,342

GLASS BUILDING BLOCK MANUFACTURE

Harold L. Eastus, Muncie, Ind., assignor to Owens-Illinois Glass Company, a corporation of Ohio Application May 7, 1937, Serial No. 141,236

2 Claims. (Cl. 81—5.1)

This invention relates to tools or like implements for use in the manufacture of hollow glass building blocks.

At the present time hollow glass building blocks are produced by assembling two comparatively shallow cup-like half-sections of the article in a manner to form a hermetically sealed unit. The process ordinarily consists in forming the half-sections on a press table of the semi-automatic type, in which a series of molds in step-by-step fashion successively pass a charging, pressing, cooling, and finally arrive at a takeout station.

After the half-sections have been thus formed and have become set sufficiently to retain their shape, but while portions thereof are still at a temperature of the order of 1050° to 1200° F., molten aluminum or other bonding medium is applied to the peripheral edges of the walls for the purpose of sealing and bonding pairs of such sections together.

These block sections must be accurately aligned, that is to say, the corners must be true and the finished blocks must be uniformly formed and assembled. It is important that the peripheral edges of the sections meet evenly in order that the bonding medium be evenly applied at these regions.

It is an object of this invention to provide a device which may be quickly and skillfully used to automatically align the meeting edges of a pair of half-sections during assembly thereof to form a hollow glass building block.

Another object of this invention is to provide means whereby varying sizes of block sections may be assembled and properly aligned without keeping great numbers of specially designed implements of varying sizes on hand.

Another object of this invention is to provide a device which may be used indefinitely; that is to say, as normal wear in the fitted parts occurs, allowances or adjustments may easily and quickly be made to maintain uniform control over the block assembly operation.

Other objects will be in part apparent and in part pointed out hereinafter.

In the drawing:

Fig. 1 is a plan view of the device shown in extended position about a pair of half-sections of a glass building block;

Fig. 2 is a plan view showing the device in closed position;

Fig. 3 is a side elevational view of the view shown in Fig. 2;

Fig. 4 is a cross-sectional view on a slightly enlarged scale taken at the line 4—4 of Fig. 1;

Fig. 5 is a cross-sectional view of the final sealing operation in forming a block; and Fig. 6 is a fragmentary perspective view of a portion of the device.

In producing a glass building block, the meeting edges of respective half-sections may first be coated with molten aluminum or other bonding medium so that when the two halves are assembled to form a completed block, the bonding medium sets and permanently joins the two halves together. As illustrated in Figs. 1 and 4, a block B is seen to consist of lower and upper half-sections 10 and 11 respectively, in approximate assembled position upon a table or support 12.

In order to properly align the half-sections, I have provided a novel indexing tool in the form of tongs 15 which consists of a pair of angular or L-shaped arms 16 hinged together by means of hinge pins 17. Handles 18 of wood, metal tubing or other material may be provided to facilitate manipulation of the device. The width of the arms 16 is sufficient that the arms when closed upon each other may bridge and substantially enclose the approximately aligned half sections 10 and 11.

Adjustable set screws 20 may be spaced at intervals around the hinged sections 16 for the purpose of properly locating and aligning the meeting edges and corners of the block sections 10 and 11. These set screws 20 are arranged in pairs on opposite sides of (i. e. above and below) a common plane passing through the arms medially thereof. It will be seen that accurate positioning of the block halves may be attained and that various sizes of blocks may be assembled accurately with this apparatus. It is also to be noted that during and/or after extended use of this device, the hinge pins 17 may possibly wear and become loose. To prevent any inaccuracies in the block assembly operation, due to such wear, the set screws 20 may be adjusted to compensate for it, thereby allowing a very accurate alignment of the block sections regardless of the worn condition of the tongs.

After the two half-sections of a block have been placed in sealing position, the tongs are grasped at the handles 18 by the operator and are placed in position over and around the block.

It will be observed from a study of Figs. 1 and 2 that any out of line condition of the block sections may be remedied by applying a certain degree of pressure to the four sides of the block. This is accomplished by drawing the handles 18 toward one another until the block halves are firmly gripped and lateral motion therebetween has come to an end. At this point in the operation, a weighted press head 22 (Fig. 5) is brought vertically downward upon the block in order that the block halves may be firmly bonded together, after which any surplus bonding material that adheres to the outside of the block may be smoothed over.

When the bonding material has set sufficiently to seal the block, the vertical pressure may be removed and the block delivered to a lehr for the usual annealing operation.

Modifications may be resorted to within the spirit and scope of the appended claims.

I claim:

1. A device for accurately aligning the approximately aligned meeting edges of a pair of rectangular half-sections of a glass block preparatory to joining the same together, comprising a pair of substantially L-shaped members, each having a pair of arms extending at right angles to each other, said members being hingedly connected together at one end for movement toward and away from each other to provide a pair of opposed right-angular jaws designed to substantially enclose the aligned half-sections in the region of their meeting edges when the jaws are moved toward each other, and a pair of set screws extending through each arm at points on opposite sides of a common medial plane passing through the arms and hinge connection.

2. A device for accurately aligning the approximately aligned meeting edges of a pair of rectangular half-sections of a glass block preparatory to joining the same together, comprising a pair of substantially L-shaped members, each having a pair of integral arms extending at right angles to each other, said members being hingedly connected together at one end for movement toward and away from each other to provide a pair of opposed right-angular jaws designed to substantially enclose the aligned half-sections in the region of their meeting edges when the jaws are moved toward each other, a pair of set screws extending through each arm at points adjacent one end thereof and on opposite sides of a common medial plane passing through said arms and the hinge connection, and a pair of set screws extending through each arm at points adjacent the other end thereof and on opposite sides of the medial plane.

HAROLD L. EASTUS.